United States Patent [19]

Fourcade

[11] 4,428,063

[45] Jan. 24, 1984

[54] DATA TIME COMPRESSION DEVICE AND DECOMPRESSION DEVICE

[75] Inventor: Pierre Fourcade, Paris, France

[73] Assignee: Thomson-CSF, Paris, France

[21] Appl. No.: 306,648

[22] Filed: Sep. 29, 1981

[30] Foreign Application Priority Data

Oct. 3, 1980 [FR] France ............................... 80 21226

[51] Int. Cl.³ ............................................... G06F 5/06
[52] U.S. Cl. .................................................... 364/900
[58] Field of Search ................................. 340/347 DD; 364/200 MS File, 900 MS File

[56] References Cited

U.S. PATENT DOCUMENTS

| | | | |
|---|---|---|---|
| 3,293,613 | 12/1966 | Gabor | 364/900 |
| 3,406,378 | 10/1968 | Bradford | 364/900 |
| 3,761,894 | 9/1973 | Pilc et al. | 364/200 |
| 3,772,657 | 11/1973 | Marsalka et al. | 364/200 |
| 4,229,815 | 10/1980 | Cummiskey | 370/84 |

*Primary Examiner*—Jerry Smith
*Assistant Examiner*—Mark P. Watson

*Attorney, Agent, or Firm*—Cushman, Darby & Cushman

[57] ABSTRACT

A device for the time compression of a continuous sequence of data, so as to effect compression in a ratio $k = p/n$ (p and n being positive integers, p not being a factor of n and n not being a factor of p), the ratio p/n representing the ratio of time required for transmission of data after compression to the time required for transmission of the same data before compression. Two memories and a control circuit generate clock signals to fill one of the memories with a package of N bits while emptying the other one. The control circuit receives a clock signal whose frequency is Fu, and divides its frequency by n and by p to generate a clock signal whose frequency is Fu/n and p clock signals whose frequencies are Fu/p and whose phases are shifted of $2\pi/p$ from one to another. A multiplexer selects one of these p clock signals, at the time when storing and writing of each package of data begins, in order to generate a read clock signal and a write clock signal which are in phase. The multiplexer is controlled by a counter determining which of the p clock signals is in phase with the clock signal whose frequency is Fu/n.

2 Claims, 3 Drawing Figures

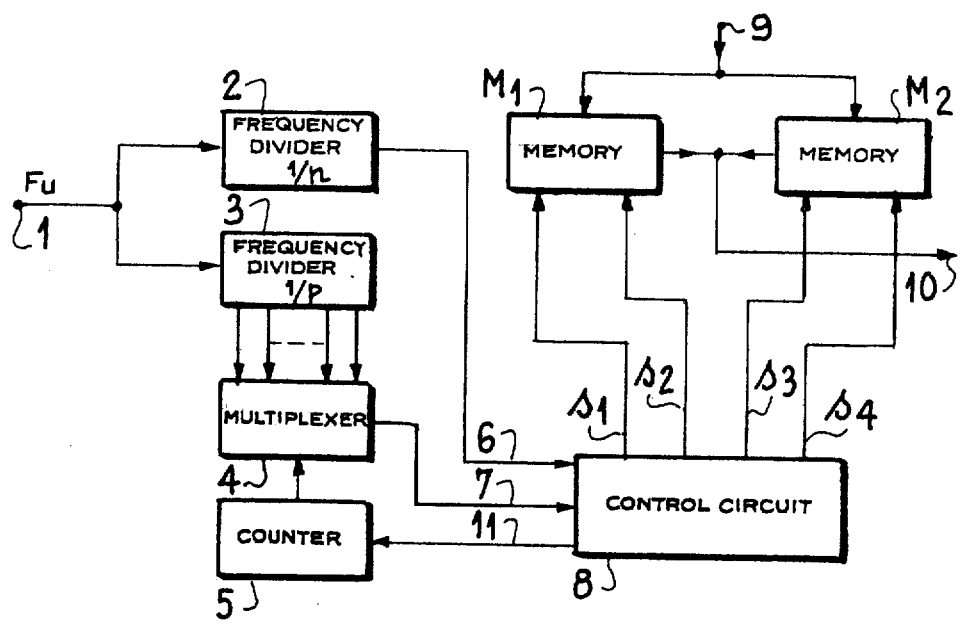
FIG_1
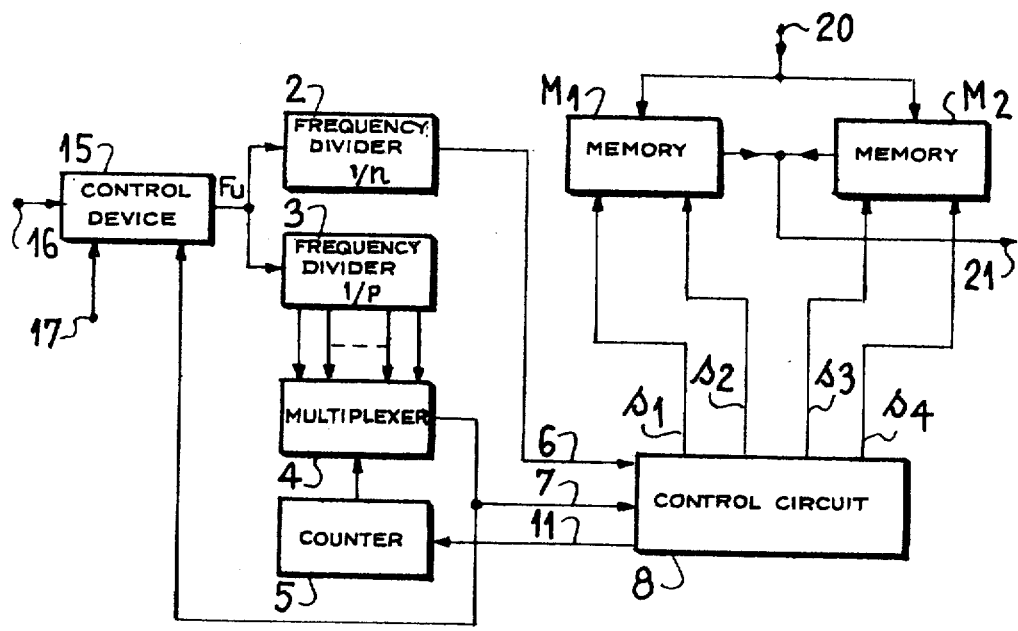
FIG_2

FIG_3
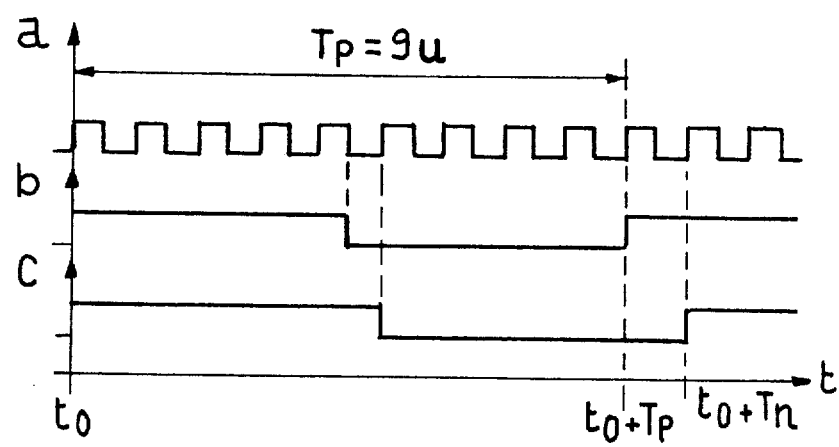
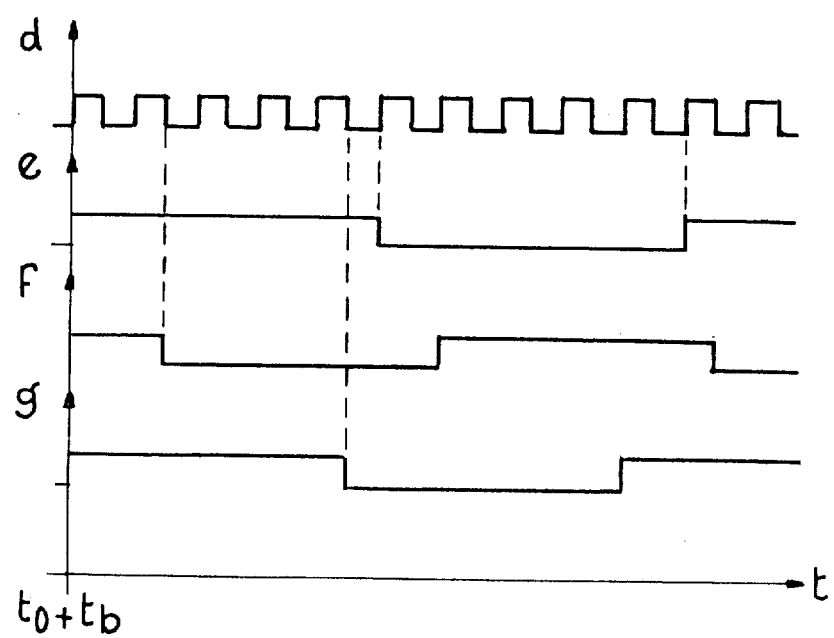

DATA TIME COMPRESSION DEVICE AND DECOMPRESSION DEVICE

BACKGROUND OF THE INVENTION

The present invention relates to data time compression devices and decompression devices.

Data compression consists in generating, from a signal formed by a continuous sequence of data at rate $F_n$, a sequence of periodic packages of N data of a duration $t_{bc}$, and for which the data rate $F_p$ is greater than $F_n$.

Such compression is achieved, for example, by filling a memory at rate $F_n$ and by emptying this memory at rate $F_p$ every $t_b$, where $t_b$ is the duration of a sequence of N data before compression. Decompression takes place similarly by means of a memory whose filling and emptying rates are reversed.

In conventional devices, the two clock signals giving the rates $F_n$ and $F_p$ are unchanged during the whole period of compression of the continuous flow of data. Now, at the beginning of each data package, the clock signals must be in phase, which places a restraint on the value $t_b$; it must be chosen with respect to the desired compression rate.

In fact, the values of periods $T_n$ and $T_p$, corresponding respectively to rates $F_n$ and $F_p$, are bound together by the relationship $T_p = (p/n) \times T_n$ (p and n positive integers, prime in relation to each other).

This latter relationship must be confirmed so that there exists a phase correspondance between $F_n$ and $F_p$ at the risk of not being able to restore at reception a continuous data flow at rate $F_n$.

The compression of a package of N data ($N = t_b/T_n$) produces a "blank" of duration $\tau$ during which no data is transmitted. This duration $\tau$ corresponds to the difference between the duration $t_b$ of the package of N data before compression and the duration $t_{bc}$ of the package after compression.

Assuming $u = T_n/n$, which entails $t_b = N.n.u$ and $t_{bc} = N.p.u$, it may be deduced that $\tau = N(n-p)u$.

I, as in the case of conventional compressers, the phase of the clock signal giving the rate $F_p$ is not modified at the end of the existing "blank", it is necessary to choose the duration of the "blank" equal to a whole number of period $T_p$ to ensure synchronization of the two clock signals at the beginning of each data package.

This is only possible when $N(n-p) = kp$, i.e. $N = k'p$ (k positive integer, $k' = k/(n-p)$).

Thus the number N cannot be any number, it depends on p. Which, for a given compression rate, quantifies the duration $t_b$ of the packages of N data among a limited set of possible values.

The present invention aims at palliating this disadvantage of conventional compressors by allowing operation of the compressors whatever the duration of the data packages for a fixed compression rate.

In the rest of the text and in our claims, a signal formed by a continuous flow of data at repetition frequency $F_n$ will be called "signal to be compressed" when this is the input signal of the compression device of the invention, and "decompressed" signal when it is a question of the output signal of the decompression device of the invention. Similarly, the signal formed by a sequence of periodic data packages, of duration $t_{bc}$, and whose data rate is $F_p$ will be called "compressed" signal. The packages of N data of a "compressed" signal will be called "compressed" packages; those of a signal "to be compressed" will be called packages "to be compressed".

BRIEF SUMMARY OF THE INVENTION

The invention relates to a device for the time compression of a continuous sequence of data, so as to effect compression in a ratio $k = p/n$ (p and n being positive integers, p not being a factor of n and n not being a factor of p), the ration p/n representing the ratio of time required for transmission of data after compression to the time required for transmission of the same data before compression. Two memories and a control circuit generate clock signals to fill one of the memories with a package of N bits while emptying the other one. The control circuit receives a clock signal whose frequency is Fu, and divides its frequency by n and by p to generate a clock signal whose frequency is Fu/n and p clock signals whose frequencies are Fu/n and whose phases are shifted of $2\pi/p$ from one to another. A multiplexer selects one of these p clock signals, at the time when storing and writing of each package of data begins, in order to generate a read clock signal and a write clock signal which are in phase. The multiplexer is controlled by a counter determining which of the p clock signals is in phase with the clock signal whose frequency is Fu/n.

BRIEF DESCRIPTION OF THE DRAWINGS

The present invention will be better understood with the help of the following description and the figures relating thereto in which:

FIG. 1 shows one embodiment of the compression device in accordance with the invention;

FIG. 2 shows one embodiment of the decompression device in accordance with the invention; and FIG. 3 shows a diagram of the signals for explaining the operation of the devices shown in FIGS. 1 and 2.

DESCRIPTION OF THE PREFERRED EMBODIMENTS

The accurate synchronization devices belonging to current technology have not been shown so as to make the drawings clearer and to simplify the description.

In FIG. 1, the compression device shown is formed principally of two parts:

The first part is formed of two memories $M_1$ and $M_2$ and a control circuit 8.

The two memories $M_1$ and $M_2$ comprise a common input, coupled to an input terminal 9 for receiving a data signal "to be compressed", and a common output coupled to an output terminal 10 for restoring a "compressed" data signal. Each of these two memories is formed from N memory compartments for the storage of N bits.

The control circuit 8, whose essential function is to control the writing and reading rates of the data in memories $M_1$ and $M_2$ comprises four outputs $s_1$, $s_2$, $s_3$ and $s_4$ connected respectively to a writing input of memory $M_1$, to a reading input of memory $M_1$, to a writing input of memory $M_2$ and to a reading input of memory $M_2$, two inputs 6 and 7 and an output 11. This circuit 8 further comprises a manual switch, not shown, whose position determines the value of the number N.

When a data signal "to be compressed", whose data rate is $F_n$, is present at the input terminal 9 at an initial time $t_0$, the control circuit 8 delivers at its output $s_1$ a control signal $e_1$ for writing in memory $M_1$ at frequency $F_n$.

The duration of this control signal $e_1$ is $t_b$, which corresponds to the time necessary for storing a package of N data of the input signal.

At time $t_1 = t_o + t_b$, the control circuit 8 delivers, at its output $s_3$, a control signal $e_2$ for writing in memory $M_2$ at frequency $F_n$ and at its output $s_2$, a control signal $l_1$ at frequency $F_p$ for reading the data stored in memory $M_1$. The duration of the writing control signal $e_2$ is $t_b$. The duration of the reading control signal $l_1$ is $t_{bc}$.

At the next time $t_o + 2t_b$, the control circuit 8 delivers, at its output $s_1$, a control signal $e_1$ for writing in memory $M_1$ and, at its output $s_4$, a control signal $l_2$ for reading from memory $M_2$.

The result is that the outputs of memories $M_1$ and $M_2$ deliver alternately, at times $t_o$ and $jt_b$ (j varying from 0 to q, q positive integer), a package of N data whose rate is $F_p$. The "compressed" data signal, supplied at terminal 10, is then formed from a succession of packages of N bits, of duration $t_{bc}$, spaced apart by a duration $\tau = t_b - t_{bc}$.

The second part of the device is formed from an input terminal 1 for receiving a clock signal $H_u$ at frequency $F_u = 1/u$, a first frequency divider 2, a second frequency divider 3, a multiplexer 4 and a counter 5. The counter 5 is a cyclic counter from 1 to p. The dividers 2 and 3 divide respectively by n and p the frequency of the signal present at their input; the values of n and p are further stored in the control circuit 8.

This second part supplies at the inputs 6 and 7 of the control circuit 8 a clock signal $H_n$ at frequency $F_n = F_u/n$, and a clock signal $H_p$ at frequency $F_p = F_u/p$, which is, at each time $t_o + jt_b$, in phase with the clock signal $H_n$. The control circuit 8 uses these two clock signals $H_n$ and $H_p$ to form the writing and reading signals $e_1$, $e_2$, $l_1$, and $l_2$, depending on the number N fixed by the switch.

The clock signal $H_n$ is supplied by the divider 2 whose input and output are connected respectively to the input terminal 1 and to the input 6 of control circuit 8.

The clock signal $H_p$ is supplied by the multiplexer 4. This multiplexer 4 comprises an output connected to the input 7 of the control circuit 8, p inputs connected respectively to p outputs of the divider 3 and a control input coupled to the output 11 of the control circuit 8 through a counter 5.

In order to better understand the operation of these elements, the following remark should be made:

If at time $t_o$, the clock signals $H_n$ and $H_p$ respectively delivered by the divider 2 and by the multiplexer 4 are brought into phase, by initializing the dividers 2 and 3, the phase of signal $H_p$ presents, at times $t_o + jt_b$, a difference of value $jN(n-p)(2\pi/p)$ with the phase which it ought to have to be in phase with signal $H_n$.

To bring them back into phase, all that is required is to modify by a value $jN(n-p)(2\pi/p)$, either the phase of signal $H_p$ or the phase of signal $H_n$. Since the signal $H_n$ corresponds to the rate of the data train "to be compressed", it cannot be transformed; the modification can only relate to $H_p$.

The second part of our device allows this bringing into phase of the clock signals to be controlled, by choosing for $H_p$ a signal taken from p signals $h_i$ (i varying from 0 to p−1) at frequency $F_p = F_u/p$, and whose p phases $\phi_i$ are such that at any time $\phi_{i+1} - \phi_i = 2\pi/p$, for every i. The p signals $h_i$ are supplied by the p outputs of the divider 3 whose input is connected to the input terminal 1.

At each time $t_o + jt_b$, the signal in phase with signal $H_n$ is the signal $h_{jN/(n-p)[p]}$, $jN(n-p)$ [p] corresponding to the value $jN(n-p)$ modulo p between 0 and p−1, $jN(n-p)$ modulo p signifying that $jN(n-p) = k''p + jN(n-p)$ whatever the integer value of k''.

At each time $t_o + jt_b$, the choice of the clock signal in phase with the signal $H_n$ depends then on the number $jN(n-p)$ [p].

So as to be able to effect this choice, the control circuit 8 comprises a pulse generator (not shown) whose output corresponds to the output 11 of circuit 8. This generator supplies to the input of counter 5, between times $t_o + jt_b + t_{bc} - tb$ and $t_o + jt_b$, $N(n-p)$ incrementation control pulses. The result is that at each time $t_o + jt_b$, counter 5 supplies to the control input of multiplexer 4 the number $jN(n-p)$ [p], which causes the signal delivered by the output of multiplexer 4 to be the signal $h_{jN(n-p)[p]}$.

There is shown in FIG. 3 a diagram of clock signals corresponding to those of a compression device in accordance with the invention operating for the following characteristic values.

$F_n = 16$ kbits/s; n = 10; p = 9; $F_p = 17.78$ kbits/s;

$F_u = 160$ kbits/s; N = 12; from which $t_b = 120$ u and $T_p = 9$ u.

In this figure, the signals a, b and c represent respectively, from time $t_o$, the clock signal $H_u$, the clock signal $h_o$ and the clock signal $H_n$.

As for signals d, e, f and g, they represent respectively, from time $t_o + t_b$, the clock signal $H_u$, the clock signal $H_n$, the clock signal $h_o$ and the clock signal $h_3$.

At time $t_o$, the clock signals $h_o$ and $H_n$ are in phase.

At time $t_o + t_b$, i.e. j = 1, the clock signal $h_o$ is no longer in phase with $H_n$, it is the signal $h_3$ which is in phase. Now at this time $t_o + t_b$, the counter receives twelve pulses; its output delivers then the value 3, from which it follows that the signal $h_3$ is indeed supplied by multiplexer 4.

At the time when the data are decompressed to reconstitute a continuous flow at rate $F_n$, the phase of the clock signal at frequency $F_p$ undergoes phase jumps of a value opposite that of the jumps undergone at the time of compression. Thus the compressed data are processed with a clock signal at frequency $F_p$ suitably synchronized with the rate thereof, then are restored at rate $F_n$, the clock signal of which is synchronized with the clock signal at frequency $F_p$ after correction of the phase jumps.

The structure of the decompression device shown in FIG. 2 is similar to that of the compression device shown in FIG. 1.

The control circuit 8 and the memories $M_1$ and $M_2$ correspond to the elements of FIG. 1 having the same reference number. Their operation is identical as long as we consider that the filling and emptying rates of the memories are reversed, that the common input of the memories is connected to an input terminal 20 for receiving a "compressed" data signal, and that the common output of the memories is connected to an output terminal 21 for restoring a "decompressed" data signal.

As for elements 2, 3, 4 and 5, they are in all respects similar to the elements shown in FIG. 1 by the same reference number.

Only element 15 has been added with respect to the compression device of FIG. 1.

This is a conventional control device 15 whose output supplies to the common input of the frequency dividers 2 and 3 the clock signal $H_u$. This control device 15 comprises a first input connected to a terminal 16 for receiving a clock signal $H_t$ at a frequency t times higher than $F_u$, a second input connected to terminal 17 for receiving a signal defining the transitions of the "compressed" data signal, and a third input connected to the output of multiplexer 4. Its operation is conventional, it consists in dividing the frequency of the clock signal $H_t$ by means of a variable number divider. The value of this variable dividing number is controlled by a control signal, supplied by a detector detecting the position of the transitions of the data signal with respect to the leading edge of the clock signal $H_p$ obtained at the output of multiplexer 4, so as to cause the frequency to vary and so the phase of this clock signal $H_p$ and of the signal $H_n$ present at the output of divider 2.

Furthermore, elements 2, 3, 4 and 5 allow $H_p$ and $H_n$ to be synchronized in accordance with the process previously described for the compression device.

The invention is not limited to the embodiments described and shown.

In particular, it is within the scope of a man skilled in the art to construct differently a circuit for controlling the multiplexer as a function of $N(n-p)$ and of the signal present at the output of the multiplexer (i.e. as a function of j).

What is claimed is:

1. A device for the time compression of a continuous sequence of data, so as to effect a compression in a ratio $k=p/n$ (p and n being positive integers, p not a factor of n, and n not a factor of p), the ratio p/n representing the ratio of the time required for transmission of data after compression to the time required for transmission of the same data before compression, comprising:
    a first and a second memory having a common data input, forming the input of the device which receives the data to be compressed, the data being received as a sequence of packages of N data at a rate $F_n$, and having a common output forming the output of the device which sends the compressed data as a sequence of packages of N data at rate $F_p$; each said memory having a writing control input and a reading control input;
    a control circuit having a first and a second input, and having four outputs connected respectively to the four control inputs of said memories and a fifth output;
    a fir frequency divider, by n, having an input receiving a first clock signal at frequency nFn, and an output connected to the first input of said control circuit for supplying thereto a second clock signal at frequency $F_n$;
    a second frequency divider, by p, having an input receiving the first clock signal and having p outputs $s_i$ (i being an integer varying from 0 to p−1) for delivering respectively p clock signals $h_i$ at frequency $F_p$ and whose respective phases $\rho_i$ are such that $$\rho i+1-\rho i=2\pi/p \text{ for every i;}$$

a multiplexer having p inputs connected respectively to the p outputs of said second frequency divider, a control input, and an output connected to the second input of said control circuit;
    means for controlling said multiplexer having an input connected to the fifth output of said control circuit and having an output connected to the control input of said multiplexer for supplying thereto a signal for selection of the clock signal $h_i$ such that:

$$i=jN(n-p)\text{modulo } p$$

at each time $t_0+jt_b$, where j is a positive whole number, where $t_0$ is a time when the clock signal $h_0$ is in phase with said second clock signal and where $t_b$ is the duration of a sequence of N data to be compressed.

2. A device for the time decomposition of data, from a compressed signal supplied by a compression device of packages of N data and whose compression ratio is $k=p/n$ (p and n positive integers, p not a factor of h, and n not a factor of p) the ratio p/n representing the ratio of the time required for transmission of data after compression to the time required for transmission of the same data before compression, comprising:
    a first and a second memory, having a common data input which receives compressed data, the data being received as a sequence of packages of N data at a rate $F_p$, and having a common output, forming the output of the device which supplies the decompressed data as a sequence of packages of N data at a rate $F_n$;
    a control circuit having a first and a second input, and having four outputs connected respectively to the four control inputs of said memories and a fifth output;
    a first frequency divider, by n, having an input receiving a first clock signal at frequency $nF_n$, and an output connected to the first input of said control circuit for supplying thereto a second clock signal at frequency $F_n$;
    a second frequency divider, by p, having an input receiving the first clock signal and having p outputs $s_i$ (i being an integer varying from 0 to p−1) for delivering respectively p clock signals $h_i$ at frequency $F_p$ and whose phases $\rho_i$ are such that:

$$\rho i+1-\rho i=2\pi/p \text{ for every i;}$$

a multiplexer having p inputs connected respectively to the p outputs of said second frequency divider control input and an output connected to the second input of said control circuit;
    means for controlling said multiplexer having an input connected to the fifth output of said circuit and having an output connected to the control input of said multiplexer for supplying thereto a signal selecting a clock signal $h_i$ such that $i=jN(n-p)$ modulo p at each time $t_o+jt_b$ where j is a positive whole number, where $t_o$ is a time when the clock signal $h_o$ is in phase with said second clock signal and where $t_b$ is the duration of a sequence of N decompressed data.

* * * * *